United States Patent Office 3,377,770
Patented Apr. 16, 1968

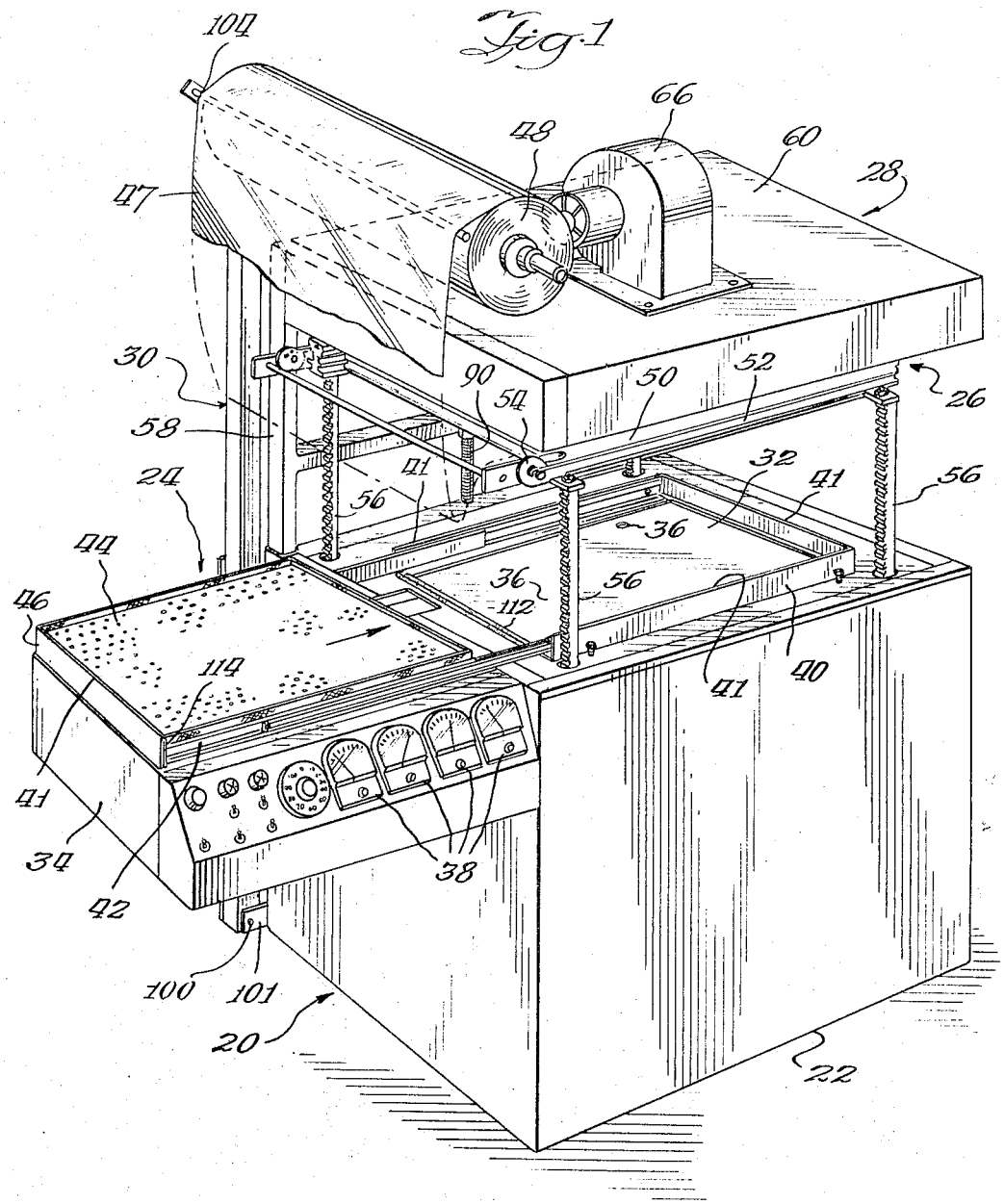

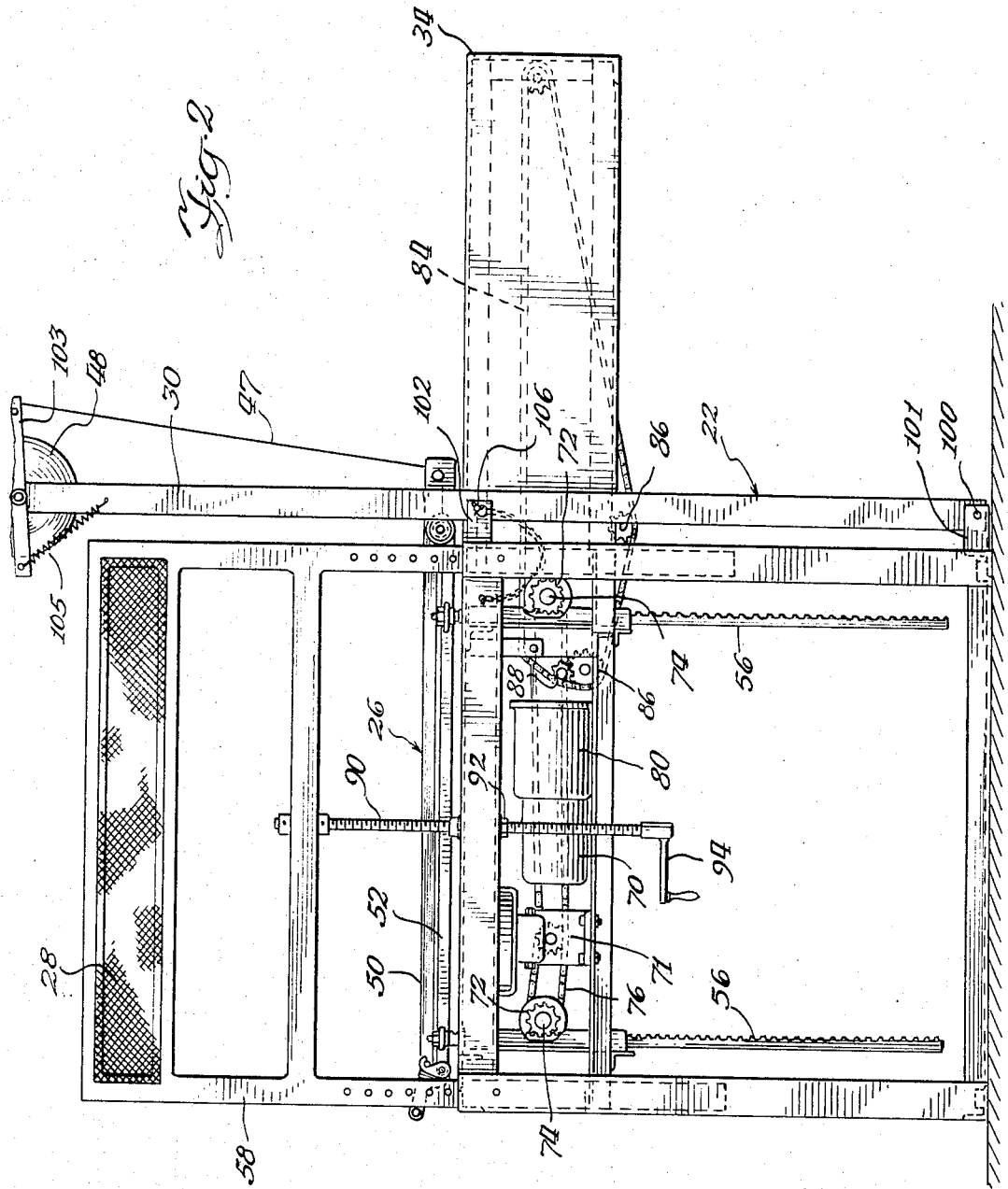

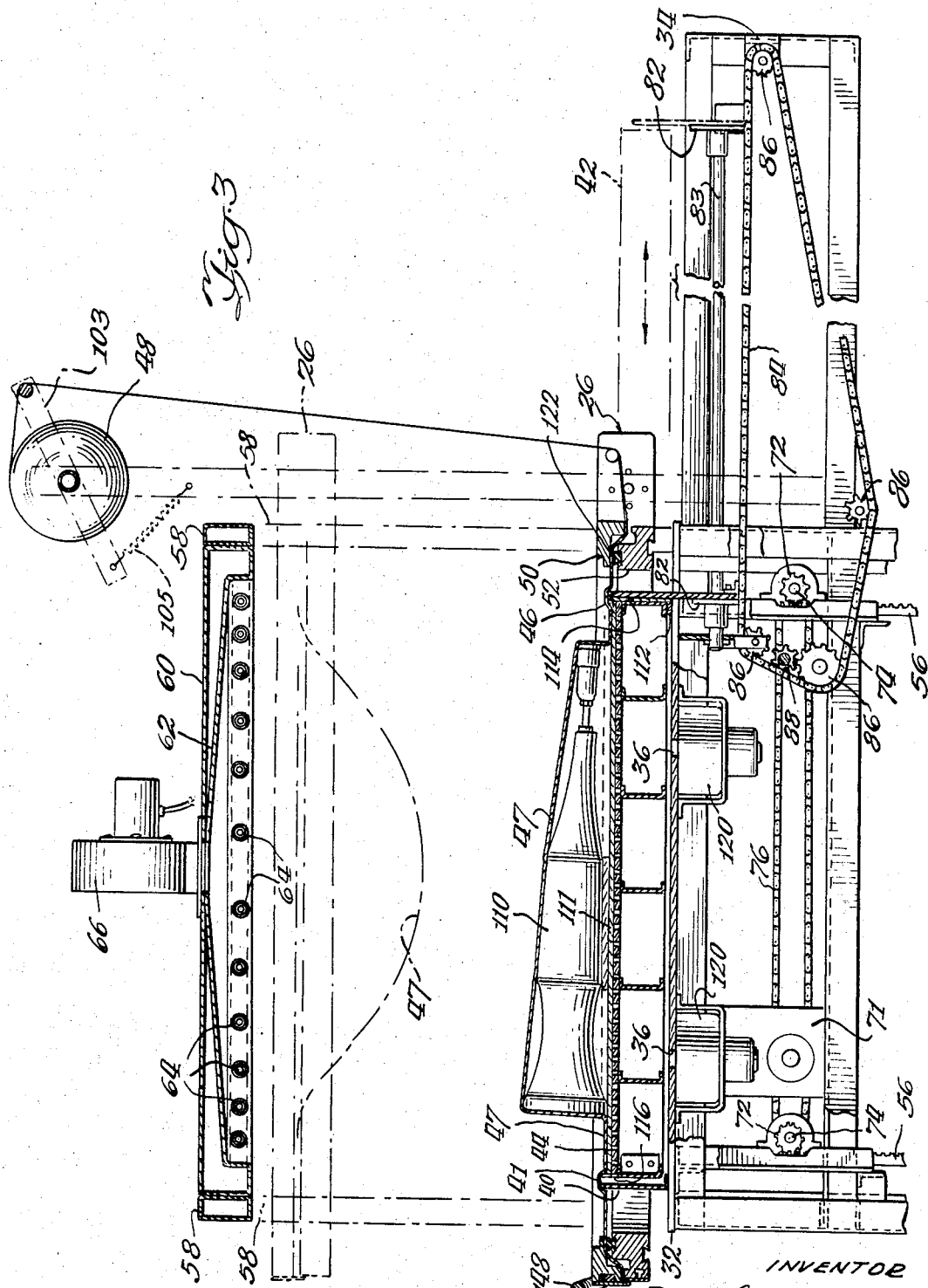

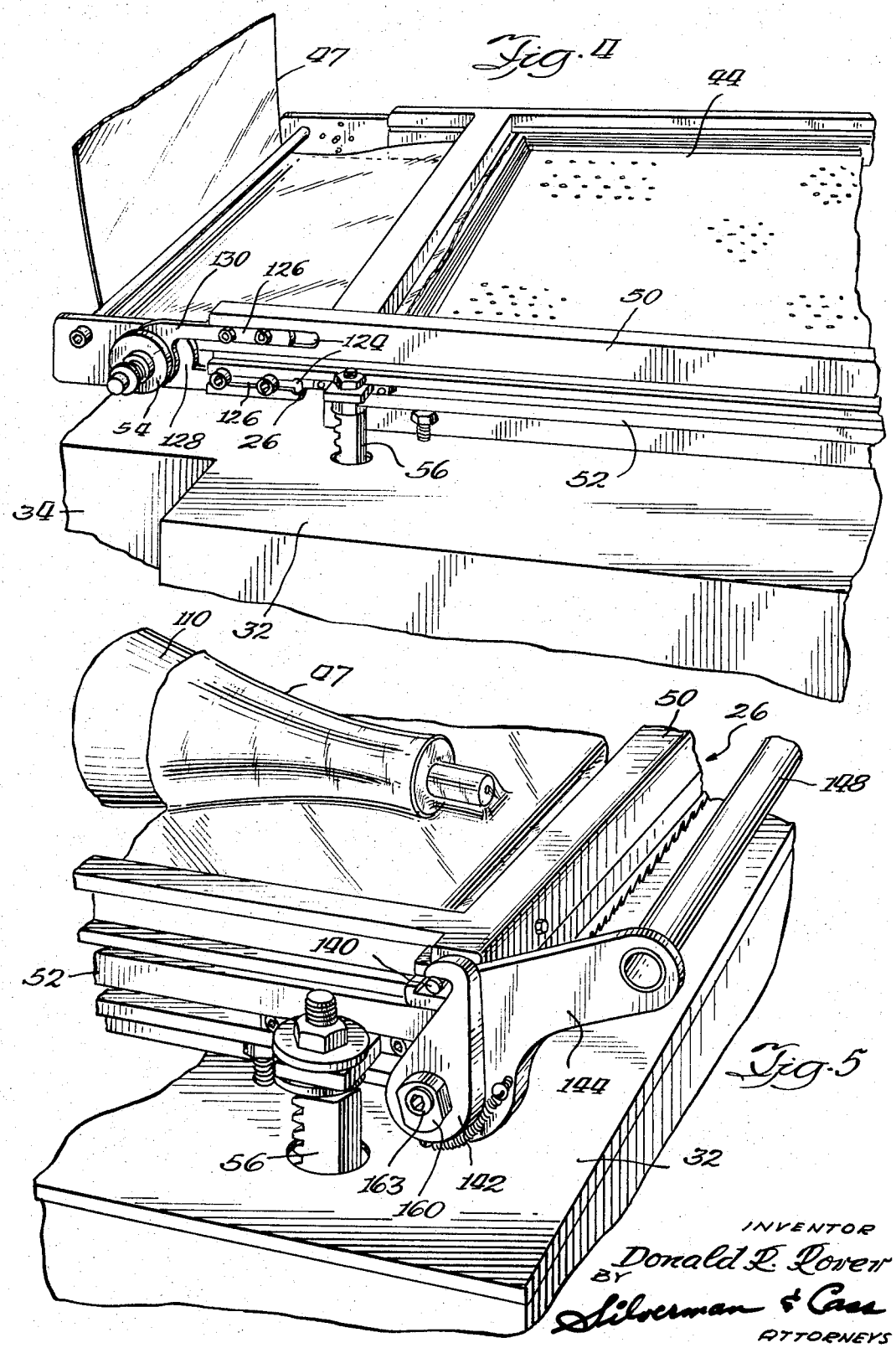

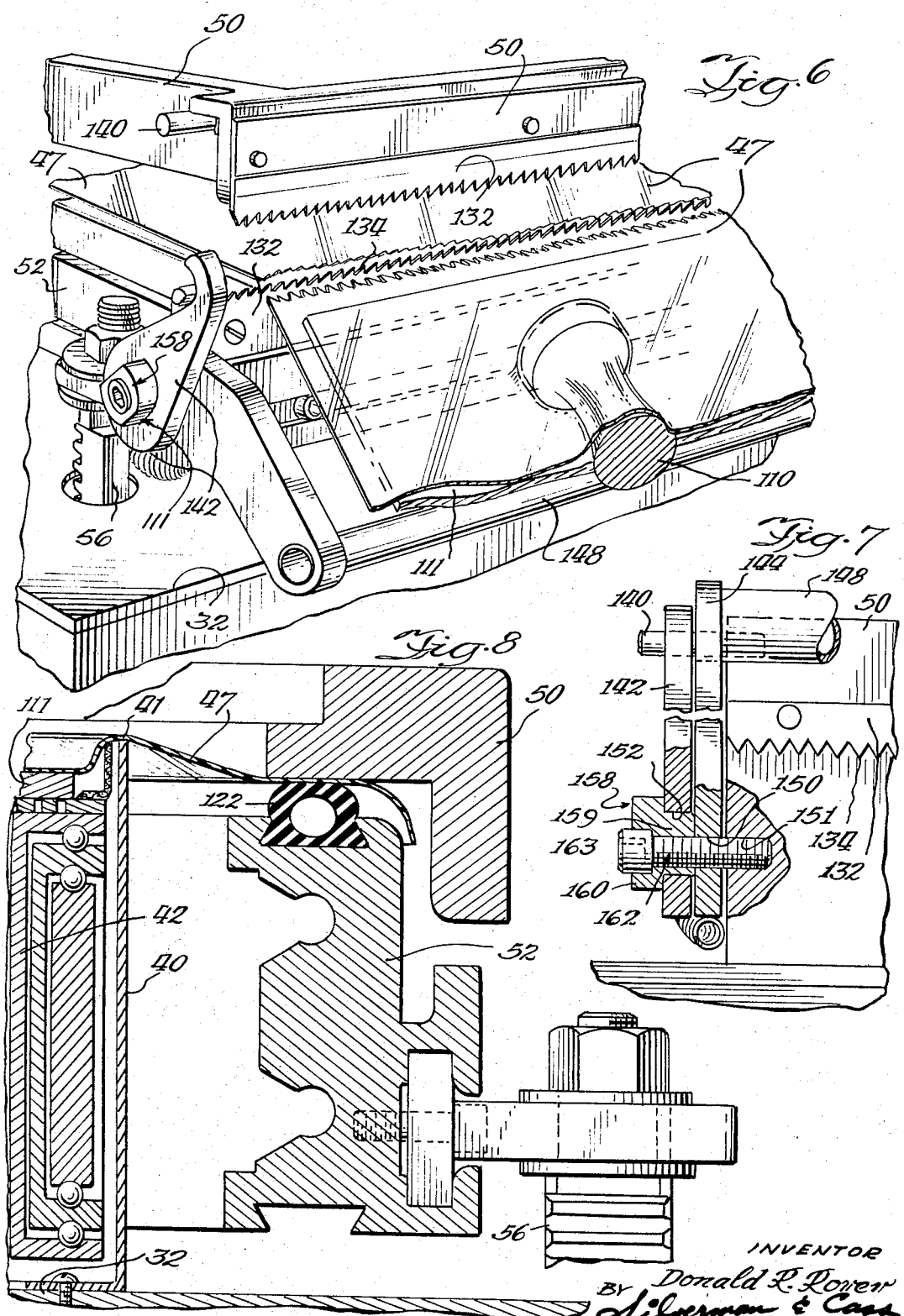

3,377,770
SKIN-PACKAGING APPARATUS
Donald R. Rorer, Lake Bluff, Ill., assignor to Stone Container Corporation, Chicago, Ill., a corporation of Illinois
Filed Jan. 17, 1967, Ser. No. 609,824
4 Claims. (Cl. 53—112)

ABSTRACT OF THE DISCLOSURE

A machine for encasing an article supported on a substrate in a skinlike film of plastic material which employs a forming station, a heater assembly for softening the plastic film, a drape frame for receiving and supporting the plastic film material, means for vacuum forming the heated plastic sheet material about the article and to the substrate, and means for operably supporting the mounted article and substrate prior to and during the forming operation, the heater assembly remaining fixed with regard to its horizontal positioning over the vacuum forming station throughout the operating cycle of the machine.

*Background of invention*

This invention relates generally to an improved packaging machine for encasing articles mounted on a base pad within a thin protective layer of thermal plastic material, such machine being referred to generally in the trade as a skin-packaging machine.

In recent years there has been an increased demand for packaging methods that will produce a package that is attractive yet economical, and readily adaptable to assembly line system of mass production. One of the methods that has experienced rapid growth and acceptance in the recent years, and to which this invention is directed, is that of covering a carded article within a thin layer or film of plastic material. In the trade this method is more commonly referred to as "skin-packaging."

Skin-packaging initially experienced a phenomenal growth primarily in the packaging of relatively small consumer items for self-service merchandising. The mounting card or substrate serves a dual function in that it provides a base for the article, and secondly, since it can be viewed through the transparent plastic film, it carries the advertising and other informative matter. The advantages of such packaging for smaller, consumer type items are well recognized.

The basic steps involved in all skin-packaging processes are substantially the same. First, the article or articles to be packaged are placed on a base pad or substrate. This base pad is normally coated with an adhesive or is chemically conditioned in some other manner to assure adhesion of the plastic film to the surface thereof, and further, must be highly porous to allow for the withdrawal of air through it so that the plastic film can be drawn into sheath like engagement with the article and into laminar contact with the base pad. After the article or articles have been positioned on the base pad, the pad is placed on a platen or some other supporting means associated with a vacuum source. The plastic film, which is usually supported between two open-frame members which retain the film in a substantially smooth taut condition, is then heated to render it pliable and easily deformable by the vacuum forming apparatus. Next, the heated film is brought down or draped over the carded article and the space therebetween is evacuated to draw the film into close contact with the article and the base pad.

The usual arrangement of the prior art machines is to provide a stationary vacuum bed or platen, a vertically movable drape frame associated with said platen and a horizontally movable oven that is indexed to and from a position in superposed relationship to said drape frame for heating of the plastic film. As an alternative, machines have been provided in which the drape frame is held stationary and the platen moved vertically to effect the relative movement therebetween. But, irrespective of the arrangement used for the drape frame and platen assembly, all prior art machines employ a horizontally movable oven.

The use of a horizontally movable oven is necessitated by the fact that the heating elements are maintained at the elevated or working temperature throughout the operating cycle of the machine. The nature of the temperatures associated with machines of this type make it essential that the oven be indexed away from the working area during the period in the operating cycle immediately before and after the heating operation in order to provide for the comfort of the operator, as well as to insure that the articles to be packaged are not damaged.

While existing, prior art machines are adequate to handle the packaging of relatively small items, they are not well adapted for use with relatively large articles, such as lamp bases, clutch plates and other industrial items. The packaging of these larger industrial items, as opposed to small commercial items, necessitates the use of heavier gauge plastic material. Also, due to the increased relative height of industrial items, the packaging apparatus must be able to accommodate a deep draw, that is, to bring the plastic film into sheath-like engagement with these larger items a higher and more efficient vacuum draw is required.

The heating operation is a critical step in any skin-packaging process, but becomes doubly critical in the packaging of larger items, where thicker film and a deeper draw are required. To achieve a satisfactory package with relatively thick or thin gauge material it is essential that the film be evenly heated to the proper temperature throughout. Prior art devices with their horizontally movable ovens, are incapable of evenly heating the plastic sheet material. As the oven moves horizontally over the drape frame and the associated sheet of plastic material, the portions closest to the oven are heated before and for a longer period of time than the other portions of the sheet material remote from the oven. Accordingly, the film closest to the oven will be hotter than the other portions. Thus there are two possible choices, the operator can package when the portion closest to the oven are at the proper temperature, or he can wait till the remote portions have been properly heated. The first alternative will result in cool spots, the second in overheated areas.

Uneven heating which results in portions of the film being below the proper temperature is troublesome in that, the relatively cool portions will not readily deform and adhere to the base pad during vacuum forming. Where the uneven heating results in portions of the film being heated above the critical temperature the problems are even more severe. As the film is subjected to the intense heat it has a tendency to droop under its own weight, this stretches the film and causes the material in the overheated regions to thin out or flow. Also when the heated plastic sheet is vacuum formed about the carded article, stretching of the sheet material ensues and there is a further tendency for the material to thin out.

The problems of poor deformaion and adhesion, as well as that of rupture at this point in the packaging of small consumer items, while a possibility, are of little concern, since the stretching is not substantial. But, where large industrial items are involved the stretching of the plastic sheet material is considerable and uneven heating may well result in ineffective deformation or rupture before and during vacuum forming. In addition, even if ruptured does not result, the overheated areas will be considerably thinner than the other areas, the end result being a package having a non-uniform gauge or thickness.

Another disadvantage of the prior art machines is occasioned by their oven assemblies, which have difficulty in heating the areas of the film immediately adjacent the drape frame to the proper temperature, without overheating the portions of the film in the center of the drape frame assembly. It can be appreciated that the frame members, which are of necessity metal, will act as heat sinks and absorb much of the applied heat before it can effectively reach the plastic sheet material. Thus, to avoid overheating of the plastic sheet material in the center of the frame, vacuum forming had to be performed while the edges of the film were below the desired temperature. With large items this will also result in rupture and poor film to pad adhesion on the periphery of the base pad.

Still another problem encountered with machines that employed a horizontally movable oven was that they required additional floor space and were not adapted for use in direct line flow production methods.

While the above discussion has been directed to the primary disadvantages of the prior art machines overcome by the instant invention, it is noted that the invention envisions solutions to many other problems inherent in the prior art as more fully explained in the following objects.

Summary of invention

Accordingly, it is one of the primary objects of this invention to provide skin-packaging apparatus that employs a stationary heating assembly that affords faster and more uniform heating and can effectively use the heavier gauge sheet material and accommodate the deep draw required by relatively large industrial items.

Still another primary object of the invention is the provision of a skin packaging machine of the type illustrated, having means for controlling the heating cycle for the plastic film material, so that comfortable working conditions can be maintained, and said sheet material properly heated in order that a high quality package may be realized.

It is a further object of this invention to provide a new and novel oven construction which enables more uniform heating of the edges of the plastic sheet material adjacent the drape frame.

A further object of this invention is to provide a novel drape frame assembly which is adapted to more effectively handle and clamp plastic sheets of varied thickness.

Still another object of the present invention is to provide a drape frame and platen assembly combination which effects a more efficient seal during the vacuum forming operation.

Still another object of the invention is to provide a drape frame that opens on a hinge axis which enables the use of a stationary oven, especially for industrial-type products.

Another object of the present invention is to provide skin-packaging apparatus with supporting means for the plastic sheet material which can easily be loaded by the operator at floor level.

Other objects and advantages of the invention will occur to those skilled in the art as a description therefor is evolved hereinafter.

Description of the drawings

The invention will now be described in detail with particular reference to the drawings wherein:

FIG. 1 is a perspective view of the skin-packaging machine embodying the invention, and illustrating the platen in the loading position, while the drape frame is in the raised position for heating of the plastic sheet material.

FIG. 2 is a rear elevational view of said machine with a portion of the cabinet removed to show details of the mechanism for moving the platen assembly and raising and lowering the drape frame.

FIG. 3 is a fragmentary medial sectional view taken through said machine, illustrating the drape frame in its lowered position with the plastic sheet material formed about the carded article, and further illustrating in phantom the drape frame in the raised position and also the platen in the loading position.

FIG. 4 is a fragmentary perspective view of the machine showing the drape frame assembly in the lowered position.

FIG. 5 is a fragmentary perspective view of the machine showing the forward end of the drape frame with its adjustable clamping assembly.

FIG. 6 is a fragmentary perspective view showing the forward end of the drape frame in its open position and the means to sever the plastic sheet material.

FIG. 7 is a partial front elevational view showing the forward end of the drape frame with the adjustable mounting for the clamping assembly illustrated in section.

FIG. 8 is a fragmentary sectional view illustrating the relationship between the drape frame and the platen assembly when the drape frame is in the lowered position and further illustrating how the plastic sheet material is stretched over the upper edge of the platen assembly to achieve a pneumatic seal.

Description of the illustrated embodiment

Referring to the drawings in FIG. 1, the machine embodying the invention is designated generally 20. The machine 20 is comprised essentially of a cabinet base 22, a platen assembly 24, a drape frame 26, a heater assembly 28 and a plastic sheet material supporting boom 30.

The base 22 of the machine is comprised of two separate sections or stations. The first being the vacuum forming station 32, more commonly referred to as the vacuum bed and the second being the in-feed station 34 extending laterally therefrom. It should be noted that at the in-feed station 34 the articles to be packaged can be placed on the base pads or substrates just prior to packaging or they may have been previously loaded thereon at a separate remote loading station. The vacuum bed 32 is provided with one or more apertures 36 which are in communication with the vacuum forming means (not shown in FIG. 1). The loading station 34 is sufficiently removed from the heating assembly to provide a cool comfortable working area for the operator, and in addition, houses the control switches and timing dials 38.

Associated with the upper surface of the base 22 and said loading and vacuum forming stations is the platen assembly 24. The platen assembly 24 is comprised of a stationary open-ended platen frame 40 and a platen 42 which is slidably associated with the frame 40 and receivable therein. In FIG. 1, the platen 42 is illustrated in the loading position out of engagement with the frame 40. In this embodiment of the invention, the platen 42 serves as the support for the carded article. After a carded article has been placed on the upper surface of the platen 42 the operator can press a "platen-in" button switch which actuates the driving mechanism to move the platen 42 horizontally into the confines of the platen frame 40. Quite obviously, in place of the manually operated platen-in button the machine could be programmed for automatic movement of the platen 42. The platen 42 and platen frame 40, which will be more fully described hereinafter, have been constructed so that they cooperate to provide a completed relatively air tight platen assembly. It is intended that the movable platen 42 received within a platen frame 40 be but an operating embodiment of the invention since it is entirely within the scope of the present invention to use a stationary platen assembly that is supported over the vacuum bed and a pusher or feeder mechanism which advances the base pad and associated article onto the upper supporting surface of a stationary platen assembly.

The platen 42 is provided with a work area defined by the pervious upper surface 44 which allows evacuation of air from below the plastic sheet for vacuum forming. In addition, the platen 42 is provided with an upstanding flanged end plate 46 along the edge thereof that will, upon reception of the platen 42 within the platen frame 40, correspond to and be aligned with the open end of the frame 40. The flanged end plate 46 mates with the edges 41 of the frame 40 and the upper surfaces define an enclosed area surrounding the base pad and associated article. Preferably, the upper edges 41 of the platen assembly are spaced above the pervious surface 44 by a distance greater than the thickness of the base pad so that a more efficient pneumatic seal during the forming operation is realized, as will be explained more fully hereinafter.

The primary function of the drape frame 26 is to support a portion of plastic sheet material for heating prior to application and forming over the article and base pad. In FIG. 1, the drape frame 26 is illustrated in the raised position and as having a portion of sheet material 47, which is drawn off role 48, supported thereby for heating. The drape frame 26, as best illustrated in FIG. 5, is comprised essentially of upper and lower open frame members 50 and 52, respectively. The frames 50 and 52 are hingedly connected together along the rear edge thereof by the hinge means 54 which are positioned on the opposite sides of the respective frames. This mode of connection allows the upper frame 50 to pivot or move with respect to the lower frame 52 so that a portion of the sheet material 47 can be placed therebetween. The frames 50 and 52 are then clamped together with the opposed edges thereof firmly gripping the sheet material 47 and holding it in a taut condition.

Referring again to FIG. 1, the drape frame 26 is supported for controlled vertical movement by four racks or standards 56. The racks 56 are provided with gear teeth along one edge thereof and are designed to mesh with pinion gears (not shown) for raising and lowering of the drape frame. The racks 56 are connected to the lower frame 52 and are telescopically received in the base 22 where the aforementioned pinion gears, illustrated in FIG. 2, engage said racks to effect the vertical movement thereof.

Positioned above the platen frame 40, the vacuum bed 42, and the drape frame assembly 26 is the heater or oven assembly 28. The heater assembly is supported in cantilever fashion by the standards 58 which, like the racks 56, are telescopically associated with the base 22. As illustrated in FIG. 2, the apparatus is provided with means to effect the vertical adjustment of the positioning of the heater assembly with respect to the upper surface of the housing 22.

The heater assembly 28, illustrated in section in FIG. 3, is comprised of an outer hood or casing 60, an inner reflecting liner 62, a plurality of heating elements 64 which are aligned parallel to each other, and a cooling fan 66. During the operating cycle, the horizontal orientation of the heater assembly 28 remains fixed, and this, as opposed to a horizontally movable heater assembly, provides for more uniform heating of the plastic sheet material 47.

The feature of the machine 20 which allows the use of a stationary heater assembly is that the heating elements 64 are maintained in a quiescent state at a reduced temperature during those portions of the operating cycle prior to and immediately after the heating operation. Control means (not shown) are provided which monitor the temperature inside the reflector liner 62 and maintain the temperature of the heating elements 64 above the ambient temperature, but well below the operating temperature of the apparatus. Just prior to the vacuum forming step, and when the drape frame 26 is in the raised position immediately below the heater assembly 28, the lower case control means automatically actuates or excites the heating elements 64 to raise their temperature to the operating level for heating and softening of the plastic sheet material. Once the temperature inside the reflector liner 62 reaches the desired level, the control means automatically reduces the power supplied to the heating elements 64, and they will return to the dwell or quiescent state.

With this arrangement, it is possible to maintain the heater assembly 28 over the work area at all times without producing uncomfortably hot working conditions, and also without the danger of damage to the carded article. In addition, since the entire portion of the plastic sheet material 47 is exposed uniformly to the elevated temperatures at the same time, the heating thereof is more uniform and results in a finished package of higher quality.

In addition to the use of a movable heater assembly, there is another factor, inherent in the prior art devices, which contributes significantly to the uneven heating of the plastic sheet material 47. With reference to FIGS. 4 and 5, it can be seen that the respective frames 50 and 52 are of open configuration and of necessity are constructed of metal. Thus, when the drape frame 24 is positioned below the heater assembly 28, a large quantity of the heat intended for the heating of the plastic sheet material is absorbed by the frames 50 and 52 also. Accordingly, the portions of the sheet material adjacent the frame will not heat up the proper temperature as fast as that portion in the center.

With reference to FIG. 3 it can be seen that the spacing between the parallel heating elements 64 varies, the spacing being greatest near the center of the hood and diminishing towards the edges thereof, so as to provide more heat at the edges of the drape frame than in the center. Accordingly, with this provision of more heating elements near the marginal edges of the drape frame the amount of heat absorbed by the metal frames is, to some degree, compensated for and more uniform heating of the plastic sheet material 47 is achieved.

To more effectively control the temperature under the reflector liner 62 the heater assembly may be provided with a fan 66 and/or cooling parts or vents (not shown). During the dwell period of the heating elements 64, the fan 66 is in operation and aids in maintaining the desired temperature level. In one form of the invention, just prior to the excitation of the heating elements to their operating temperature the fan 66 is automatically shut off and the heating of the sheet material 47 progresses unhampered. The use of the fan 66 allows the dwell or quiescent temperature of the elements 64 to be maintained at a higher level than would be possible without the additional cooling effect of the fan. In addition, the fan 66 may be used to vary the programming of the heating cycle, if a longer heating period is desired the fan 66 may be left on for a predetermined period of time after the heating elements reach their operating temperature. Also, the fan 66 may be used to cool the plastic film after vacuum forming.

The basic sequence of operation of the illustrated embodiment of the invention is as follows: With platen 42 in the loading position, as illustrated in FIG. 1, a base pad and its associated article or articles are placed on the upper surface 44 of the platen 42. Prior to this step, the drape frame 26 is raised automatically to the upper position with the plastic sheet material 47 immediately below the heating elements 64. The automatic timing system of the apparatus maintains the heater element 64 in a normally quiescent state with the oven temperatures substantially below that required for softening of the plastic material, but preferably hot enough to effect a slight preheating of the sheet material. Also, if used, the fan 66 is in operation during the period to effect a more efficient control of the oven temperature. Next, the platen 42 is moved from the loading position to the operating position wherein it is received within the open ended frame 40. The automatic timing apparatus of the machine 20 causes energization of the heating elements 64 to raise the hood temperature to the level required to render the sheet material pliable and amenable to vacuum forming. As illustrated in phantom in FIG. 3, as the sheet material is heated it will start to sag or droop thereby indicating to the operator that the plastic sheet material 47 is ready for forming. The drape frame 24 is then lowered into surrounding engagement with the platen assembly 24 by the operator, or if desired, a thermocouple and control unit can be operably located with respect to the film to monitor the temperature thereof and at the proper temperature effect the lowering of the drape frame. With the drape frame in surrounding engagement with the platen assembly, the plastic sheet material 47 is draped or stretched over the carded article and the peripheral edge 41 of the platen assembly. The stretching of the sheet material 47 over the edge 41 of the platen assembly 24 effects a pneumatic seal sufficient to allow the vacuum forming of the sheet material 47. Accordingly, after the plastic sheet material 47 has been so stretched the vacuum forming means (illustrated in FIG. 3) is actuated to create a negative pressure differential under the plastic sheet material 47 to draw said sheet material 47 into sheath like engagement with the article and into laminar contact with the base pad. Next, the upper and lower frames 50 and 52 of the drape frame are separated and the encased article and base pad are removed as illustrated in FIG. 6. This removal of the finished package draws another portion of the plastic sheet material 47 off the roll 48 and into position for the next cycle. The upper and lower frames 50 and 52 are then clamped together to engage the new portion of plastic sheet material, the forward ends of said frames being provided with means to sever the sheet material adjacent the packaged article. The drape frame 26 is then automatically indexed to the preheat position and the platen 42 is indexed to the loading station, the machine being ready for another cycle of operation.

FIGS. 2 and 3 illustrate the internal assemblage of the machine that achieves the above enumerated operating cycle. The primary or driving force for the drape frame 26 can be supplied, for example, by a reversible motor 70 through the rack and pinion supporting and driving arrangement for the drape frame 26. As previously discussed, the drape frame 26 is mounted on four standards or racks 56 which telescope into the housing 22. Associated with each rack 56 is a pinion gear 72. The pinion gears 72 on the forward end of the machine are mounted on a common shaft 74, and likewise the pinion gears 72 on the rear end of the machine are also mounted on a common shaft designated 74. The shafts 74 are coupled for synchronized movement by a chain 76. The reversible motor 70 is connected, through a gear box 71, to the forward shaft 74 in any desired manner, preferably by a chain drive (not shown). Accordingly, the motor 70 will drive the forward shaft 74 which in turn will drive the rear shaft 74 through the chain 76. The respective shafts 74 each drive their associated pinion gears 72 which in turn engage the racks 56 to raise and lower the drape frame 26.

Further illustrated in FIGS. 2 and 3, is the apparatus which controls the movement of the platen 42 between the loading position, illustrated in phantom in FIG. 3 and the working position. The prime mover or source of power for the platen drive is supplied by the reversible motor 80. The platen 42 is mounted on the upper surface of the housing 22 and has attached to the lower portion of the rear end plate 46 a pusher 82. The pusher 82 is mounted on a shaft 83 for reciprocal movement and is attached to and driven by the chain 84. The chain 84 passes over various idler gears 86 and a driving gear 88. The driving gear 88 is coupled to the reversible motor 80 and effects movement of the chain 84 which in turn moves the platen 42, through the pusher 83, between the loading position and the operating position.

In FIG. 2 there is further illustrated a means for adjusting the vertical height of the heater assembly 28. As previously discussed, the heater assembly 28 is supported by standards 58 which are telescopically received in the 22 of the machine 20. To adjust the height of the heater assembly 28 there is provided a jack screw 90 which is operably associated with the standards 58 and is threadedly engaged in a portion 92 of the housing 22. The jack screw 90 is provided with a handle 94 which facilitates the turning thereof, the threaded engagement at 92 effecting vertical movement of the heater assembly 28 upon the rotation of the jack screw 90 relative to the threaded portion 92.

FIG. 2 illustrates the mounting or supporting means for the roll of plastic sheet material 48. The mounting means is comprised essentially of a roll supporting boom 30 which is pivotally attached to the base 22 at 100 by the bracket 101. Spaced vertically above the pivotal mounting at 100 is a second bracket 102 which is provided with an aperture. The boom 30 is provided with a like aperture such that when the boom is in the proper position the respective apertures are aligned and a pin 106 is inserted therein to maintain the boom 30 in the proper position. Further, the supporting boom 30 is provided with means to hold the plastic sheet material taut during the operating cycle. The means includes a pivotally mounted arm 103 which is provided with a rod or extension 104 which engages the plastic sheet material 47, as illustrated in FIG. 1. The purpose of the arm 103 and its associated rod 104 is to engage the plastic sheet material 47 and hold it relatively taut during the operating cycle. The arm 103 is biased by the spring 105 in the upward direction to assure that the rod 104 properly engages the sheet material 47.

Returning to FIG. 3, there is illustrated in detail the construction of the platen assembly 24, the drape frame 26 and the vacuum forming means. There is shown a lamp base 110 and a base pad 111 covered with a thin film of plastic sheet material 47. The platen 42 as illustrated received in the platen frame 40 and positioned over the vacuum bed 42. The platen frame 40, as illustrated in FIG. 1, is of three-sided configuration having an open end and is sealingly connected to the upper surface of the vacuum bed 32. On the upper surface of the vacuum bed 32 there is provided a gasket 112, which is positioned to coincide with the open end of the frame 40. The platen 42 is also provided with a gasket 114, which is interposed between the platen and the rear flange end portion 46 and extends outwardly beyond the platen 42 coextensive with the flange portion 46, see FIG. 1. When the platen 42 is fully received within the platen frame 40 the gaskets 112 and 114 are in engagement and the portions of the gasket 114 which extend beyond the platen 42 are in engagement with the edges of the platen frame 40, thus, effecting a pneumatic seal along the open end of said platen frame 40.

The platen 42 is of rectangular box-like configuration having a pervious upper surface 44 and a lower surface of open construction, so that during the forming step the air can be evacuated therethrough. The upper surface 44 is positioned below the upper edge 41 of the platen assembly 24 and may be provided with a peripheral flange 116 which functions as an aid in the positioning of the base pad 111 during the loading operation.

Positioned on the underside of the vacuum bed 32 are a pair of vacuum turbines 120. The vacuum turbines 120 communicate with the apertures 36 in the vacuum bed, which in turn communicate with the platen assembly 42, thus, enabling the turbine to evacuate the air from under the plastic sheet material 47 during the forming step. While vacuum turbines have been illustrated, they merely constitute representative means for creating the negative pressure differential required for vacuum forming. It is contemplated that various types of vacuum producing apparatus could be devised that also would achieve the desired results.

Referring to FIGS. 3 and 8, the relationship between the drape frame 26 and the platen assembly 24 will be described. As was discussed previously, when the platen 42 is fully received in the platen frame 40, the respective parts engage to effect a pneumatic seal around the entire periphery of the platen assembly. When the term "pneumatic seal" is used it is not intended to imply that the seal is of a relatively high degree of efficiency, but rather refers to a pneumatic seal sufficient to allow the heated plastic sheet material 47 to be drawn over the carded article.

The drape frame 26 which carries the plastic sheet material 47 is comprised of upper and lower open frames 50 and 52 which are clamped together to engage and support the sheet material 47. One of these frames, the lower frame in the illustrated embodiment, carries a gasket 122. The gasket 122 and the opposed edge of the upper frame firmly grip the plastic sheet material 47 therebetween to hold it taut, without the danger of severing said sheet material. It will be recalled that the plastic sheet material used in this operation is extremely thin, normally between 3 and 30 millimeters. Therefore, it is essential that the gripping be effective, yet care must be taken to avoid damage to the sheet material 47.

In FIGS. 3 and 6, the drape frame 26 is illustrated in the lowered position in surrounding engagement with the platen assembly 24. When in this position the opposed edges of the open frames 50 and 52, which grip the plastic sheet material 47, are positioned below the upper edge 41 of the platen assembly 24. With this arrangement the plastic sheet material 47 is draped over the carded article and is stretched over the edge 41 to achieve a pneumatic seal around the entire upper edge of the platen assembly.

With the drape frame 26 positioned, as discussed in the preceding paragraph, the vacuum turbines 120 are actuated to create a negative pressure differential under the plastic sheet material 47. Due to the sealing engagement of the sheet material 47 with the edge 41 of the platen assembly 24, the sheet material will be drawn downwardly into sheath-like engagement with the carded article. It can be seen that as the sheet material 47 is drawn by the vacuum turbines 120 it is further stretched over the edge 41 and, accordingly, an even more efficient pneumatic seal is achieved.

FIG. 4 illustrates primarily the manner in which the upper and lower frames 50 and 52 are hingedly connected together and how the lower frame member 52 is connected to the racks 56. The upper and lower frames 50 and 52 are provided with slots 124 in the rear portions thereof, received in said slots 24 are the connecting arms 126 of the hinge assemblies 54. The hinge assemblies 54 are each comprised of two pivotally mounted members 128 and 130 which carry the aforementioned connecting arms 126. Preferably each hinge 54 is spring-biased by a torsion spring (not shown) tending to separate the members 128 and 130 so that when the clamp pressure on the respective frames is released, the upper frame 50 will pivot upwards, away from the lower frame 52.

The adjustable clamping means of the present invention is illustrated in detail in FIGS. 5–7. FIG. 5 shows the drape frame 26 engaged about the platen assembly 24 with the plastic sheet material 47 vacuum formed about the carded article 110. The respective frame members 50 and 52, and the adjustable clamping means are shown in the closed or clamped position. FIG. 6 illustrates how the packaged article is removed and the plastic sheet material 47 severed, and further, how this removal indexes a second portion of plastic sheet material into the proper position for the next cycle of operation.

In FIGS. 5–7 only the clamping arrangement on one side of the forward end of the drape frame has been illustrated. This has been done for convenience, and it is to be understood that the clamping arrangement on the other side of the forward end of the drape frame is of identical construction.

With reference to FIGS. 5–7 it can be seen that the forward end of the upper and lower frames 50 and 52 are provided with means to sever the plastic sheet material 47 after removal of the carded article. While various types of cutting means can be used, as seen in FIG. 6, each frame is provided with a severing plate 132, each of which is provided with a plurality of cutting teeth 134 along the opposed edges thereof. When their respective upper and lower severing plates are in juxtaposed relationship the teeth 134 interengage to sever the plastic sheet material 47.

The adjustable clamping arrangement of the present invention is comprised essentially of a pin 140 which is mounted on the side of the forward end of the upper frame 50, a hook or gripper element 142 which is adapted to engage the pin 140, the lever 144 which has the hook 142 pivotally mounted thereon and is in turn pivotally connected to the lower frame 52, and an eccentrically mounted camming means 146 which effects the aforementioned pivotal mounting of the hook 142 to the lever 144. Since there is a duplicate clamping structure on the opposite side of the forward end of the drape frame, there is provided a handle 148 which interconnects the levers 144 of the respective clamping arrangements so that they may be simultaneously actuated to provide even clamping pressure. While the use of a handle 148 is preferred, it is not necessary and the respective clamping arrangements may be actuated independently of each other. Also, the arrangement of the respective members may be reversed from that illustrated, i.e., the pin 140 being placed on the lower frame member 52 and the hook and lever arrangement, 142 and 144, mounted on the upper frame 50.

The adjustable attachment of the clamping assembly to the lower frame 52 is illustrated in section in FIG. 7. The lever 144 and the lower frame 52 are provided with aligned apertures 150 and 151, respectively. The hook 142 is provided with an enlarged bore 152 which is aligned with the aforementioned apertures 150 and 151. The connection between the lever 144 and the hook 142 is effected by the camming element 158. The camming element 158 is provided with a cylindrical portion 159 and an enlarged head portion 160 which is provided with flats 161 that facilitate the engagement therewith by wrench means. The camming element 158 is further provided with a counter-sunk bore 162 which is eccentrically offset with respect to the axis of the element 158. The clamping arrangement is assembled by placing the camming element 158 in the bore 152 of the hook 142 with the enlarged portion 160 in engagement with the outer surface of the hook 142. Next, the respective apertures in the camming element 158 the lever 144 and the lower frame 52 are aligned and a bolt 163 is passed therethrough and secured in the tapped bore 151 of the frame 52.

The operation of the clamping arrangement is illustrated in FIGS. 5 and 6 and is substantially as follows: First, the upper frame 50 is brought into juxtaposition with the lower frame 52 to firmly clamp the plastic sheet material 47 between the opposed edges thereof. Next, the hooks 142 are advanced into engagement with the pins 140. The levers 144 are then operated by the handle 148 to effect relative rotation between the camming elements 158 and the hooks 142. Due to the eccentricity of the mounting of the camming elements 158 this relative rotation causes hooks 142 to move downward relative to the levers 144, the net result being that the hooks 142 more firmly engage the pin 140 and draw the respective frames tightly together to more firmly clamp the plastic sheet material 47 therebetween.

From the above description and with reference to FIG. 7 it can be seen that the relative position of the camming element 158 with respect to the lever 144 will control the amount of movement between the lever 144 and the hook 142, and accordingly, controls the clamping pressure exerted by the upper and lower frames. The operator need only loosen the bolt 163 and adjust the aforementioned relative positioning to achieve the clamping pressure desired. This feature is important in two respects, first it adapts the frame for more efficient clamping of plastic sheet material of different thicknesses, and secondly, it provides means whereby the effect on the clamping pressure occasioned by the wear of the gasket 122 can be compensated for.

While the adjustable clamping arrangement illustrated constitutes a representative form of the invention, it is not intended that the invention be limited thereto. It is realized that one skilled in the art could readily devise various arrangements which could effect the clamping of the upper and lower frames 50 and 52, for example air cylinders with movable actuator rods could be used to effect the required clamping between the upper and lower frame members.

The electronic control circuitry for the operation of the above described apparatus in and of itself, does not constitute the inventive subject matter of this application and is merely used to augment the disclosed apparatus to produce the desired mode of operation. One skilled in the art could readily devise various control systems that would operate the apparatus in the desired manner.

While the illustrated embodiment of the invention has been described in detail this has been done for purposes of clarity and understanding, and it is understood and envisioned that various changes and modifications may be practiced upon the structure illustrated within the spirit of the invention, which is solely defined by the scope of the appended claims.

What is desired to be secured by Letters Patent of the United States of America is:

1. A skin-packaging machine comprising a frame having a vacuum bed, a platen assembly including a work area for receiving and supporting a base pad and an associated article, vacuum forming means associated with said vacuum bed and adapted to be placed in communication with said work area, a heater assembly including a housing mounted in a fixed horizontal relationship over said vacuum bed throughout the operating cycle of the skin-packaging machine, heating element means mounted within said housing, drape frame means including a drive mechanism for selectively positioning a sheet of plastic material in a first horizontal position below said heater assembly and in a second position overlying said work area for vacuum forming of said sheet, electrical control means associated with said heater assembly for maintaining a temperature of said assembly at a preheat level below that required for vacuum forming of said sheet material, said control means being responsive to a predetermined electrical signal to raise said heating elements to an elevated temperature sufficient to render said plastic sheet material amenable to vacuum forming, said control means then monitoring the temperature of said heating assembly to return said heating elements to the preheat level after the proper elevated vacuum forming temperature is reached.

2. A skin-packaging machine as defined in claim 1 wherein said control means further includes means to effect automatic lowering of said drape frame from said first position to said second position after the proper elevated vacuum forming temperature is achieved.

3. A machine as defined in claim 1 wherein said control means further includes a fan associated with said heater assembly, said fan being adapted to effect circulation of the air around the said heating elements whereby the desired preheat temperature for said sheet material may be maintained while the actual temperature of the individual heating elements is above said preheat temperature, said fan means being programmed with the operating cycle of said machine whereby it is adapted to be de-energized during heating of the plastic material to the forming temperature.

4. A skin-packaging machine as defined in claim 1 wherein said platen assembly is comprised of a stationery platen frame which is open on one end thereof, and a receiving and supporting member with a pervious upper surface slidably associated with said platen frame and adapted to be received in the open end thereof to define a completed platen assembly.

References Cited

UNITED STATES PATENTS

| Re. 25,466 | 11/1963 | Kostur | 53—112 |
| 1,144,981 | 6/1915 | Lightfoot | 219—242 |
| 2,828,799 | 4/1958 | Harrison | 154—41 |
| 3,024,579 | 3/1962 | Stockhausen et al. | 53—22 |

FOREIGN PATENTS

| 688,258 | 6/1964 | Canada. |

TRAVIS S. McGEHEE, *Primary Examiner.*

UNITED STATES PATENT OFFICE
CERTIFICATE OF CORRECTION

Patent No. 3,377,770

April 16, 1968

Donald R. Rorer

It is certified that error appears in the above identified patent and that said Letters Patent are hereby corrected as shown below:

Column 1, line 33, "attractive" should read -- attractive, --; line 37, "within" should read -- with --. Column 2, line 63, "deformaion" should read -- deformation --; line 70, "ruptured" should read -- rupture --. Column 6, line 25, after "up" insert -- to --; line 39, "parts" should read -- ports --. Column 7, line 75, after "the" insert -- housing --. Column 8, line 22, "The", second occurrence, should read -- This --. Column 9, line 19, "millimeters" should read -- mils --.

Signed and sealed this 10th day of February 1970.

(SEAL)
Attest:

Edward M. Fletcher, Jr.
Attesting Officer

WILLIAM E. SCHUYLER, JR.
Commissioner of Patents